(12) United States Patent
Huang et al.

(10) Patent No.: US 11,457,509 B2
(45) Date of Patent: Sep. 27, 2022

(54) RELAY REPEATER NETWORK COMMUNICATION SYSTEM

(71) Applicants: Hebei Qianxing Technology Co., Ltd., Shijiazhuang (CN); Xiamen Came Technology Co., Ltd., Xiamen (CN)

(72) Inventors: Xingzhi Huang, Nanping (CN); Xuhui Liu, Shenzhen (CN)

(73) Assignees: HEBEI QIANXING TECHNOLOGY CO., LTD., Shjiazhuang (CN); XIAMEN CAME TECHNOLOGY CO., LTD., Xiamen (CN)

( * ) Notice: Subject to any disclaimer, the term of this patent is extended or adjusted under 35 U.S.C. 154(b) by 114 days.

(21) Appl. No.: 17/122,545

(22) Filed: Dec. 15, 2020

(65) Prior Publication Data

US 2021/0345453 A1 Nov. 4, 2021

(30) Foreign Application Priority Data

Apr. 30, 2020 (CN) .......................... 202010364952.7

(51) Int. Cl.
| | | |
|---|---|---|
| *H04W 88/04* | (2009.01) | |
| *H04B 1/44* | (2006.01) | |
| *H04W 4/10* | (2009.01) | |
| *H04W 84/20* | (2009.01) | |
| *H04B 7/14* | (2006.01) | |

(52) U.S. Cl.
CPC .............. *H04W 88/04* (2013.01); *H04B 1/44* (2013.01); *H04B 7/14* (2013.01); *H04W 4/10* (2013.01); *H04W 84/20* (2013.01); *H04M 2250/08* (2013.01)

(58) Field of Classification Search
CPC ....... H04W 88/04; H04W 4/10; H04W 84/20; H04W 12/02; H04W 12/03; H04B 1/44; H04B 7/14; H04B 1/40; H04M 2250/08
See application file for complete search history.

(56) References Cited

U.S. PATENT DOCUMENTS

2011/0306393 A1 * 12/2011 Goldman ............... H04M 1/04
345/173
2014/0334375 A1 * 11/2014 Sugitani ............... H04L 1/1835
370/315

FOREIGN PATENT DOCUMENTS

| EP | 1370097 A1 * | 12/2003 | ............ H04M 1/733 |
| GB | 2392056 A * | 2/2004 | ............ G07C 13/00 |
| WO | WO-9638990 A2 * | 12/1996 | ............ H04B 7/269 |

OTHER PUBLICATIONS

Translation of WO9638990-A2 (Year: 1996).*
Translation of EP-1370097-A1 (Year: 2003).*

* cited by examiner

Primary Examiner — Nishant Divecha
(74) Attorney, Agent, or Firm — Chun-Ming Shih; Lanway IPR Services

(57) ABSTRACT

A relay repeater network communication system includes a relay repeater and three digital walkie-talkie sets, wherein each of the digital walkie-talkie sets comprises at least one digital walkie-talkie, the relay repeater is connected to each of the digital walkie-talkies, and the relay repeater communicates with each of the digital walkie-talkies through the DECT communication method to realize the mutual communication between each of the digital walkie-talkies, thus achieving the effect of multi-person speech and multi-person listening, which is convenient for the collaborative work of people and enriches the function of digital walkie-talkies.

10 Claims, 11 Drawing Sheets

RELAY REPEATER NETWORK COMMUNICATION SYSTEM

TECHNICAL FIELD

The present invention relates to the technical field of voice communication, in particular to a relay repeater network communication system.

BACKGROUND

Walkie-talkies are more and more widely used in daily production and life, and are favored by more and more people due to their convenient and timely conversation functions. At present, most walkie-talkies are handheld. When a conversation is needed, the conversation can be carried out by pressing the conversation switch, and only one-sided conversation can be realized. The speaker cannot listen, and the listener cannot speak.

Therefore, how to realize the interactive communication between multiple walkie-talkies is an urgent technical problem to be solved by those skilled in the art.

SUMMARY

In view of this, the object of the present invention is to overcome the shortcomings of the prior art and provide a relay repeater network communication system to realize the object of multi-person speech and multi-person listening and increase the function of digital walkie-talkies.

To achieve the above object, the present invention adopts the following technical solutions:

A relay repeater network communication system, comprising: a relay repeater and three digital walkie-talkie sets, wherein each of the digital walkie-talkie sets comprises at least one digital walkie-talkie, the relay repeater is connected to each of the digital walkie-talkies, and the relay repeater communicates with each of the digital walkie-talkies through the DECT communication method to realize the mutual communication between each of the digital walkie-talkies.

Preferably, the relay repeater comprises: a first master module, a second master module, and a first slave module; the three digital walkie-talkie sets are a first direct-connected walkie-talkie set, a second direct-connected walkie-talkie set and a first extended walkie-talkie set;

the first direct-connected walkie-talkie set, the second direct-connected walkie-talkie set and the first extended walkie-talkie set all comprise at least one digital walkie-talkie;

the first master module and the second master module are respectively connected to the first direct-connected walkie-talkie set and the second direct-connected walkie-talkie set, and the first slave module is connected to the first extended walkie-talkie set;

the first master module, the second master module, and the first slave module superimpose the voice signal of each of the digital walkie-talkies in an AC-coupled manner, so as to realize the mutual communication between each of the digital walkie-talkies.

Preferably, the first extended walkie-talkie set comprises a first walkie-talkie master and at least one walkie-talkie slave;

the first slave module is connected to the first walkie-talkie master, and the first walkie-talkie master is also connected to each of the walkie-talkie slaves through TDMA, so as to realize the expansion of the number of digital walkie-talkies in the first extended walkie-talkie set.

Preferably, the first direct-connected walkie-talkie set comprises five walkie-talkie slaves, the second direct-connected walkie-talkie set comprises five walkie-talkie slaves, and the first extended walkie-talkie set comprises four walkie-talkie slaves.

Preferably, the relay repeater comprises: a third master module, a second slave module, and a third slave module; the three walkie-talkie sets are a third direct-connected walkie-talkie set, a second extended walkie-talkie set and a third extended walkie-talkie set;

the third direct-connected walkie-talkie set, the second extended walkie-talkie set and the third extended walkie-talkie set all comprise at least one digital walkie-talkie;

the third master module is connected to the third direct-connected walkie-talkie set, and the second slave module and the third slave module are respectively connected to the second extended walkie-talkie set and the third extended walkie-talkie set;

the third master module, the second slave module, and the third slave module superimpose the voice signal of each of the digital walkie-talkies in an AC-coupled manner, so as to realize the mutual communication between each of the digital walkie-talkies.

Preferably, the second extended walkie-talkie set comprises a second walkie-talkie master and at least one walkie-talkie slave; the third extended walkie-talkie set comprises a third walkie-talkie master and at least one walkie-talkie slave;

the second slave module is connected to the second walkie-talkie master, and the second walkie-talkie master is also connected to each of the walkie-talkie slaves through TDMA, so as to realize the expansion of the number of digital walkie-talkies in the second extended walkie-talkie set;

the third slave module is connected to the third walkie-talkie master, and the third walkie-talkie master is also connected to each of the walkie-talkie slaves through TDMA, so as to realize the expansion of the number of digital walkie-talkies in the third extended walkie-talkie set.

Preferably, the third direct walkie-talkie set comprises five walkie-talkie slaves, the second extended walkie-talkie set comprises four walkie-talkie slaves, and the third extended walkie-talkie set comprises four walkie-talkie slaves.

Preferably, the first slave module, the second slave module and the third slave module are all connectable to an extended relay repeater, through which an unlimited number of digital walkie-talkies are extended.

Preferably, the relay repeater further comprises a walkie-talkie slave detection module;

the walkie-talkie slave detection module is configured to detect the number of the walkie-talkie slaves respectively connected to the first walkie-talkie master, the second walkie-talkie master and the third walkie-talkie master, so as to be extended or deleted according to the number.

Preferably, the relay repeater further comprises a registration module;

the registration module realizes the paired connection between the walkie-talkie slave and the first walkie-talkie master, the second walkie-talkie master and the third walkie-talkie master, so as to realize the encrypted transmission of the voice signal.

The present invention adopts a relay repeater network communication system, through which multiple digital walkie-talkies realize communication, and the adopted DECT communication method can ensure high-definition communication quality. The effect of multi-person speech and multi-person listening between digital walkie-talkies can be achieved through the relay repeater, which is convenient for the collaborative work of people and facilitates the function of digital walkie-talkies.

BRIEF DESCRIPTION OF THE DRAWINGS

In order to explain the embodiments of the present invention or the technical solutions in the prior art more clearly, the drawings that need to be used in the description of the embodiments or the prior art will be briefly introduced. Obviously, the drawings in the following description are only a part of the embodiments of the present invention. For those skilled in the art, other drawings can be obtained based on these drawings without creative work.

FIG. 3b is a schematic diagram of the call principle after the time slot allocation in FIG. 3a;

DESCRIPTION OF THE EMBODIMENTS

In order to make the objectives, technical solutions, and advantages of the present invention clearer, the technical solutions of the present invention will be described in detail hereinafter. Obviously, the described embodiments are only a part of the embodiments of the present invention, rather than all the embodiments. Based on the embodiments of the present invention, all other implementations obtained by those skilled in the art without creative work shall fall within the protection scope of the present invention.

Figure 1:
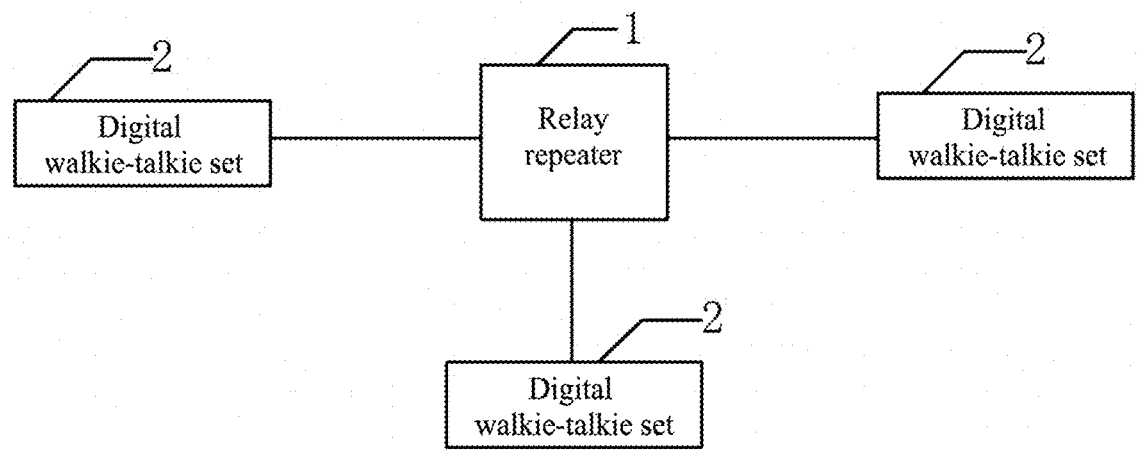
FIG. 1 is a schematic diagram of the structure of a relay repeater network communication system according to an embodiment of the present invention.
Figure 2:
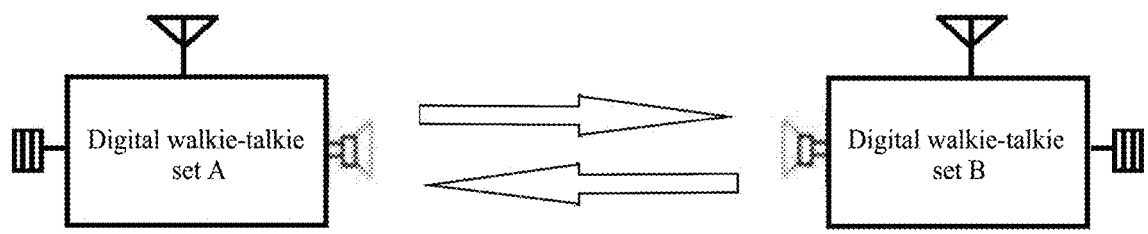
FIG. 2 is a schematic diagram of DECT communication full-duplex communication in FIG. 1.
Figure 3A:
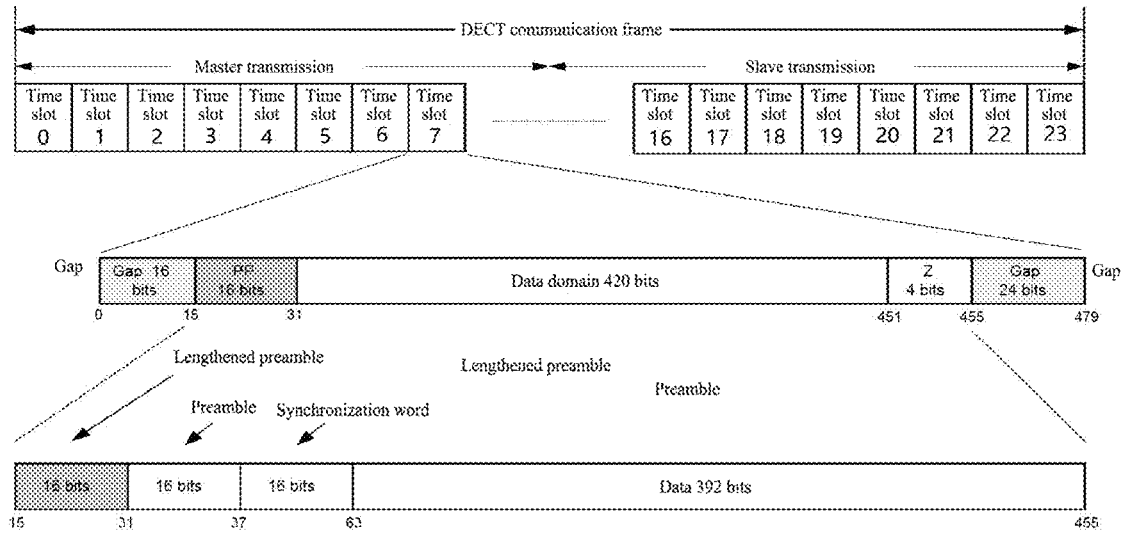
FIG. 3a is a schematic diagram of DECT communication time slot allocation in FIG. 1.
Figure 3B:
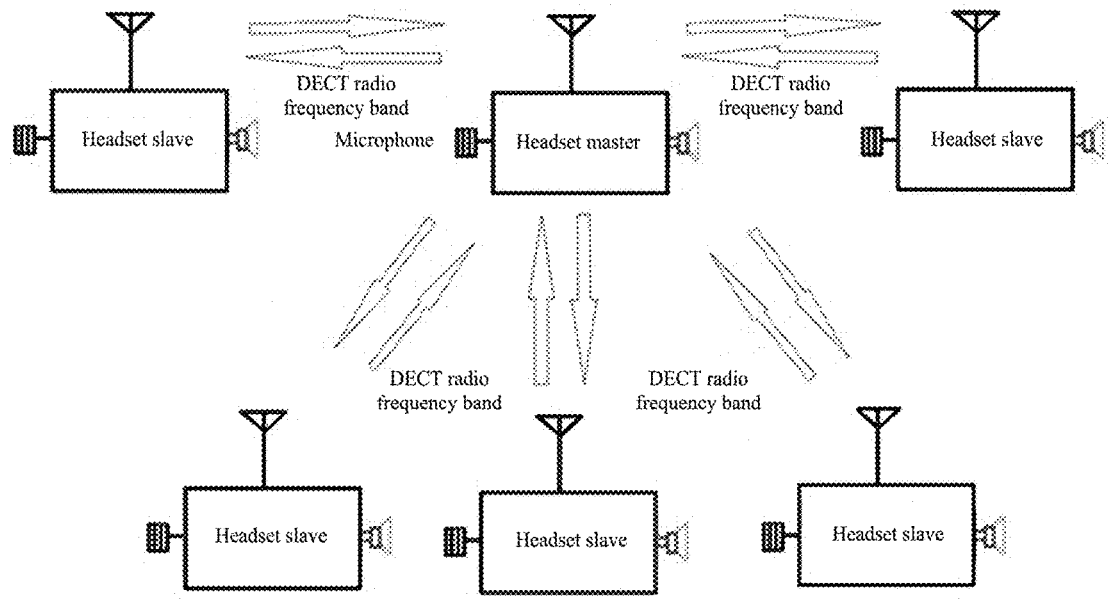

FIG. 1 is a schematic diagram of the structure of a relay repeater network communication system according to an embodiment of the present invention; FIG. 2 is a schematic diagram of DECT communication full-duplex communication in FIG. 1; FIG. 3a is a schematic diagram of DECT communication time slot allocation in FIG. 1; and FIG. 3b is a schematic diagram of the call principle after the time slot allocation in FIG. 3a.

As shown in FIG. 1, a relay repeater network communication system in this embodiment comprises: a relay repeater 1 and three digital walkie-talkie sets 2. Each of the digital walkie-talkie sets 2 comprises at least one digital walkie-talkie. The relay repeater 1 is connected to each of the digital walkie-talkies, and the relay repeater 1 communicates with each of the digital walkie-talkies through the DECT communication method to realize the mutual communication between each of the digital walkie-talkies.

In a specific implementation process, the digital walkie-talkie takes the DECT-based head-mounted digital walkie-talkie as an example. The use of a head-mounted digital walkie-talkie eliminates the need for hand-held operations and can free your hands. At the same time, since the head-mounted digital walkie-talkie uses a full-duplex communication method, uninterrupted voice communication can be realized. Because a head-mounted digital walkie-talkie is used, it is marked as a headset, a headset master, and a headset slave in the relevant diagram. Full duplex is a term for communication transmission. Full duplex communication allows data to be transmitted in two directions at the same time. As shown in FIG. 2, it is equivalent to a combination of two simplex communication methods in terms of capability. Full duplex refers to the simultaneous (instantaneous) bidirectional transmission of signals (A→B and B→A), referring to A→B and B→A at the same time, which is instantaneously synchronized. Simplex only allows Party A to transmit information to Party B, but Party B cannot transmit information to Party A. Through this full-duplex method, users wearing walkie-talkie headsets can communicate with each other without interruption at the same time, just like two people talking face to face.

The DECT (Digital Enhanced Cordless Telecommunication) technology used in this solution has been recognized by more and more users, standardization organizations, network operators and equipment manufacturers due to its high-quality use path technology. The DECT has been verified to have a variety of adaptable network access uses suitable for residential and commercial buildings, and have flexibility in public places. Its voice quality can be compared with corded phones. The DECT has the security performance of advanced digital technology coding, high-density users, flexible bandwidth allocation, multiple service support, price advantages, flexible configuration and easy installation methods.

A DECT system comprises a DECT master device (headset master) and one or more slave devices (headset slave). Its core technologies comprise multiple carriers (MC), time division multiple access technology (TDMA), time division duplex principle (TDD) radio frequency access mode, HFSS dynamic channel selection, high capacity allocation, and multi-unit system, which can be used in busy and even harsh radio environments. These methods enable the DECT to provide high-quality services without the need for frequency establishment. The DECT can efficiently use the assigned radio frequency spectrum, and even multiple programs use the same spectrum. The applicable frequency range is 1880-1900 MHz, which uses GFSK modulation. The use of wireless access technology also brings great risks. These defects can be resisted by the DECT standard. Its effective registration and certification protocols and encryption methods have greatly improved its security. Registration is actually the process in which a master opens the network service to a specific slave. The registration of DECT can be done "over the air", and "a wireless connection is established so that both parties can confirm that they are using the same password." The identities of the master and the slave will be exchanged, and in each signal connection, both parties must calculate a password, which will not be transmitted wirelessly. A slave may have multiple registrations. For each registration, the slave will calculate a password to be connected to the master. The new password and network identity will be added to the master registration list. The slave can only be locked with one master.

The selection and allocation of dynamic channels is a major feature of DECT. All DECT devices will regularly scan the local radio environment, at least once every 30 seconds. Scanning means receiving and measuring the strength of local radio frequency signals on all free channels. By scanning all channels, the received signal field strength instruction form is listed as the basis for channel selection. The idle time slot is temporarily not used to transmit or receive signals. In the received signal field strength instruction form, the low field strength instruction indicates that the channel is free and there is little interference, while the high field strength instruction indicates that the channel is busy and there is much interference. With the help of the signal field strength instruction form, the DECT master or slave can select the most suitable channel (with least interference) to establish a signal connection. In the slave part of DECT, the channels with the highest received signal field strength instruction will be continuously analyzed to confirm whether the signal from the master station has the right to enter the slave. At the DECT master station, the channel with a low received signal field strength instruction is used to establish a connection. The dynamic channel selection and allocation mechanism ensures that the wireless connection is always established on the channel with the least interference.

The radio interface of DECT is established based on the principle of multiple carriers/time division multi-channel/time division duplex. The basic DECT frequency allocation uses 10 carrier frequencies between 1880 and 1900 MHz. The time spectrum of DECT is divided into time frames that repeat every 10 ms. Each time frame consists of 24 time slots, and each time slot can be used to transmit or receive signals. For the two basic time frames of DECT of voice service functions separated by 5 ms, the two time frames are paired to provide a bearing capacity required for a typical full-duplex connection of 32 kbit/s. In order to simplify the implementation of DECT, this time frame is divided into two groups, and each group has 12 time slots. One group is used for forward transmission (a master) and the other group is used for reverse transmission (a slave). The DECT of the time division duplex structure can carry out up to 12 voice connections at the same time, enabling both transmission and reception. Because of the advanced wireless communication protocol, the DECT can combine multiple channels into one carrier, which can provide a variety of broadband for bit error rate protection for data transmission purposes. The DECT standard provides a transmission speed of n×24 Kbits/s or even 552 Kbit/s at maximum. The 24-time slot allocation schematic diagram of the related time division is as shown in FIG. 3, through which the specific allocation of 24 time slots can be clearly understood. Through 24-time slot time division multiplexing of the DECT, the simultaneous voice communication function of 6 users (1 master and 5 slaves) can be realized, as shown in FIG. 3*b*, so as to realize the mutual communication between multiple walkie-talkies.

For example, using a digital walkie-talkie at the shooting site as an example, the head-mounted type can eliminate the need for handheld and button-start operations, which is conducive to efficient communication. The director or commander can direct the staff at each position in real time. Lighting engineers, sound engineers and actors can participate in the communication, change the previous propaganda mode, and communicate in two ways without pressing a button, release both hands, and improve work efficiency. Each person is equipped with a digital walkie-talkie, so that the voice messages of multiple people can be heard at the same time. It is convenient for the collaborative work and complete shooting tasks efficiently. Of course, the number of specific digital walkie-talkies is not limited, and can be selected according to actual needs.

The present invention adopts a relay repeater network communication system, through which multiple digital walkie-talkies realize communication, and the adopted DECT communication method can ensure high-definition communication quality. The effect of multi-person speech and multi-person listening between digital walkie-talkies can be achieved through the relay repeater 1, which is convenient for the collaborative work of people and facilitates the function of digital walkie-talkies.

Figure 4:
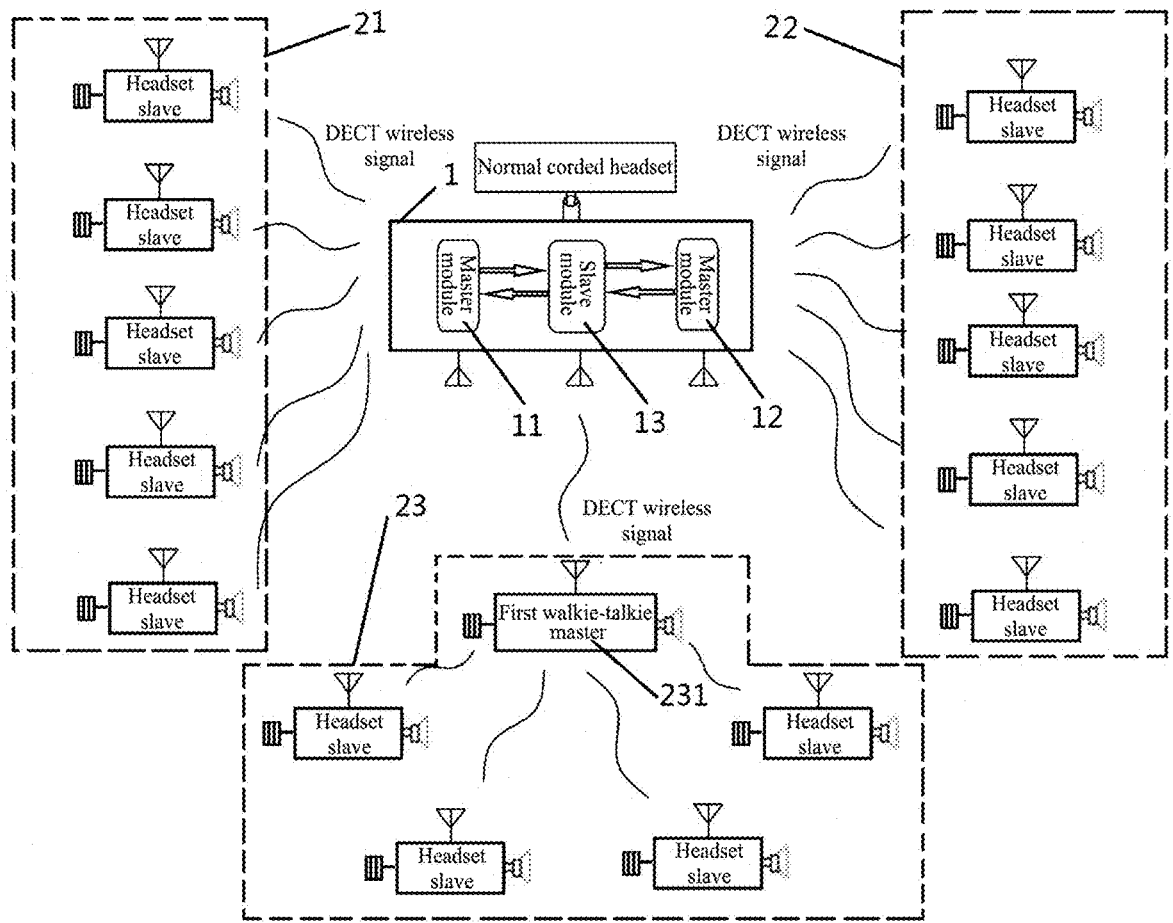
FIG. 4 is a schematic diagram of the structure of a working mode of a relay repeater according to an embodiment of the present invention.

FIG. 4 is a schematic diagram of the structure of a working mode of a relay repeater according to an embodiment of the present invention.

As shown in FIG. 4, this embodiment provides a relay repeater network communication system, wherein the relay repeater 1 comprises: a first master module 11, a second master module 12, and a first slave module 13; the three digital walkie-talkie sets 2 are a first direct-connected walkie-talkie set 21, a second direct-connected walkie-talkie set 22 and a first extended walkie-talkie set 23, wherein the first direct-connected walkie-talkie set 21, the second direct-connected walkie-talkie set 22 and the first extended walkie-talkie set 23 all comprise at least one digital walkie-talkie. The first master module 11 and the second master module 12 are respectively connected to the first direct-connected walkie-talkie set 21 and the second direct-connected walkie-talkie set 22, and the first slave module 13 is connected to the first extended walkie-talkie set 23. The first master module 11, the second master module 12, and the first slave module 13 superimpose the voice signal of each of the digital walkie-talkies in an AC-coupled manner, so as to realize the mutual communication between each of the digital walkie-talkies. In order to further increase the number of digital walkie-talkies, the first extended walkie-talkie set 23 comprises a first walkie-talkie master 231 and at least one walkie-talkie slave. The first slave module 13 is connected to the first walkie-talkie master 231, and the first walkie-talkie master 231 is also connected to each of the walkie-talkie slaves through TDMA, so as to realize the expansion of the number of digital walkie-talkies in the first extended walkie-talkie set 23. As shown in FIG. 4, the first direct-connected walkie-talkie set 21 may comprise five walkie-talkie slaves, the second direct-connected walkie-talkie set 22 may comprise five walkie-talkie slaves, and the first extended walkie-talkie set 23 may comprise four walkie-talkie slaves.

Specifically, as shown in FIG. 4, the first master module 11 and the second master module 12 are respectively connected to five headset slaves through TDMA (Time Division Multiple Access) of 6 time slots. The first slave module 13 of the relay repeater 1 is connected to the first walkie-talkie master 231 in the first extended walkie-talkie set 23 through DECT wireless signals, and the first walkie-talkie master 231 is connected to the other 4 walkie-talkie slaves through TDMA (Time Division Multiple Access) of 6 time slots, so as to realize three interconnected voice networks. The first master module 11, the second master module 12, and the first slave module 13 of the relay repeater 1 superposes the voice signal of each of the digital walkie-talkies in an AC-coupled manner, so as to realize the mutual communication between each of the digital walkie-talkies, and realize the interconnection and mutual communication between 15 digital walkie-talkies through a relay repeater 1. Of course, in order to further expand the number of digital walkie-talkies, the first walkie-talkie master 231 can also be replaced with another relay repeater 1, which can further expand the number of wireless walkie-talkie terminals (masters/slaves). The way of multi-level interconnection can expand an unlimited number of terminals. As long as high-definition voice communication can be maintained, unlimited walkie-talkie calls can be realized.

Figure 5:
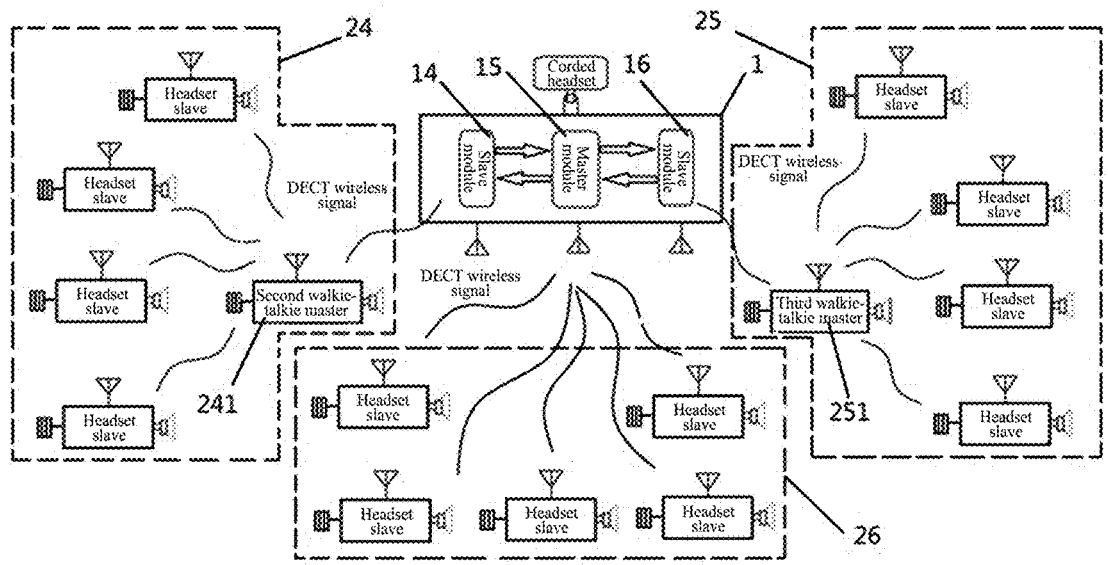
FIG. 5 is another schematic diagram of the structure of a working mode of a relay repeater according to an embodiment of the present invention.

FIG. 5 is another schematic diagram of the structure of a working mode of a relay repeater according to an embodiment of the present invention.

As shown in FIG. 5, this embodiment provides a network communication system of the relay repeater 1, wherein the relay repeater 1 comprises: a third master module 15, a second slave module 14, and a third slave module 16. The three walkie-talkie sets are a third direct-connected walkie-talkie set 26, a second extended walkie-talkie set 24 and a third extended walkie-talkie set 25. The third direct-connected walkie-talkie set 26, the second extended walkie-talkie set 24 and the third extended walkie-talkie set 25 all comprise at least one digital walkie-talkie. The third master module 15 is connected to the third direct-connected walkie-talkie set 26, and the second slave module 14 and the third slave module 15 are respectively connected to the second extended walkie-talkie set 24 and the third extended walkie-talkie set 25. The third master module 15, the second slave module 14, and the third slave module 16 superimpose the voice signal of each of the digital walkie-talkies in an AC-coupled manner, so as to realize the mutual communication between each of the digital walkie-talkies. The second extended walkie-talkie set 24 comprises a second walkie-talkie master 241 and at least one walkie-talkie slave; the third extended walkie-talkie set 25 comprises a third walkie-talkie master 251 and at least one walkie-talkie slave; the second slave module 14 is connected to the second walkie-talkie master 241, and the second walkie-talkie master 241 is also connected to each of the walkie-talkie slaves through TDMA, so as to realize the expansion of the number of digital walkie-talkies in the second extended walkie-talkie set 24. The third slave module 16 is connected to the third walkie-talkie master 251, and the third walkie-talkie master 251 is also connected to each of the walkie-talkie slaves through TDMA, so as to realize the expansion of the number of digital walkie-talkies in the third extended walkie-talkie set 25. For example, the third direct walkie-talkie set 26 may comprise five walkie-talkie slaves, the second extended walkie-talkie set 24 may comprise four walkie-talkie slaves, and the third extended walkie-talkie set 25 may comprise four walkie-talkie slaves.

Specifically, as shown in FIG. 5, the third master module 15 of the relay repeater 1 is connected to five headset slaves through DECT wireless signals. The second slave module 14 and the third slave module 16 are respectively connected to another second headset master and the third headset master. The second headset master and the third headset master are connected to four headset slaves respectively. Similarly, three voice communication networks are obtained through the relay repeater 1. A terminal network with 15 digital walkie-talkies communicated with each other is formed in an AC-coupled manner. Similarly, in order to achieve unlimited expansion, the second walkie-talkie master 241 or the third walkie-talkie master 251 can also be replaced with the relay repeater 1, and then the voice communication quality can be extended unlimitedly.

As shown in FIG. 4 and FIG. 5, it can be understood as two different working modes of the relay repeater 1, that is, the working mode of one master module and two slave modules, and the working mode of two master modules and one slave module. The working modes are different, and the connection modes are also different. However, the connection principle is interconnected and the working principle is the same. The hardware circuit structure of the master and the slave is the same. The functions of the master and the slave are implemented through software control. The master and the slave comprise a microphone, a voice input signal amplifier, and a DECT main control chip (ADPCM voice codec, (MC, TDMA, TDD) control and GFSK modulation), a radio frequency chip (radio frequency transmission, reception and control), a volume adjustment button, a code matching button, a voice output signal amplifier circuit, and a speaker. The working process of the master and the slave are as follows: the voice is input through the microphone and enters the main control chip through the voice input signal amplifier circuit, and is encoded into digital information using ADPCM voice, is modulated into a digital radio frequency signal through GFSK, and is finally sent out in a specific frequency band via an antenna through the radio frequency chip; at the same time, the signal is received from the antenna and enters the main control chip through the radio frequency chip, and is modulated and restored to ADPCM encoded information through GFSK, and then is decoded into an analog voice signal using ADPCM, and is finally restored into voice through the speaker using the voice output signal amplifier circuit. The main difference between the master and the slave is the program difference in the main control chip. The program in the master is configured into an FP (master) mode according to the specifications of the DECT chip, and the program in the slave is configured into a PP (slave) mode according to the specifications of the DECT chip. Although the DECT protocol can support up to 12 groups of two-way channels for transmission, in order to ensure communication quality, increase bandwidth, and reduce bit error rate, the 12 groups of two-way channels are divided into 6 time slots, in which 2 time slots are occupied for bit error rate protection, and 6 time slots (1 master, and 5 slaves) are occupied for actual real-time two-way communication. The master (FP) will continuously scan 10 RF carrier free channels (5 time slots except the time slots occupied by the master itself), and send timing signals in broadcast mode. PP uses the FP broadcast service to achieve clock synchronization, so as to enter the channel at the most suitable time. The program is the program that is input into the relay repeater when it is generated by the system. Each of the digital walkie-talkies and the relay repeater 1 are executed in accordance with the program. The head-mounted digital walkie-talkie itself has functions that make it possible to quickly and efficiently complete the system configuration and the mutual communication between digital walkie-talkies.

Figure 6A:
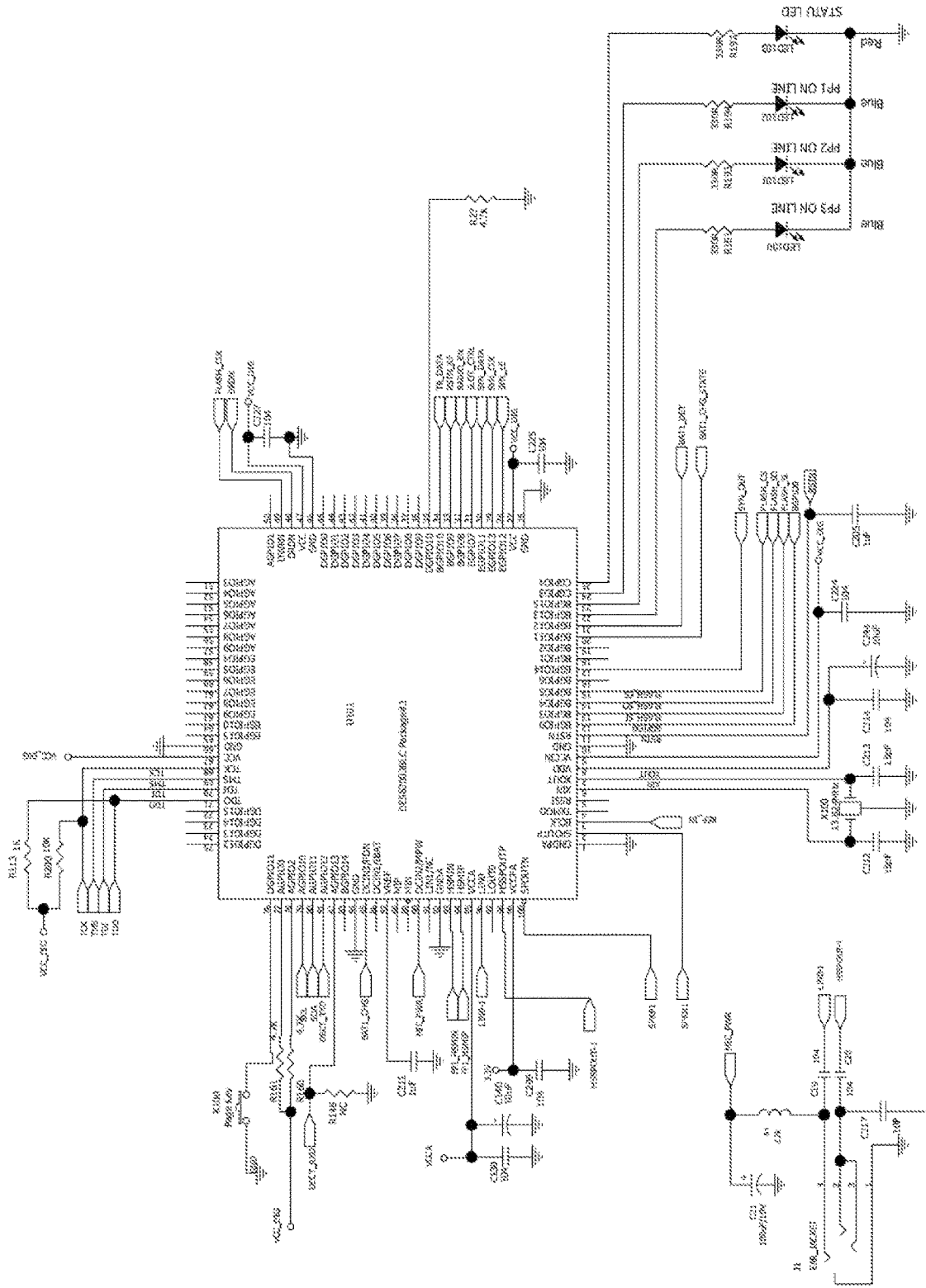
FIG. 6a is a circuit schematic diagram of a first part of a main control chip of a relay repeater in FIG. 1.
Figure 6B:
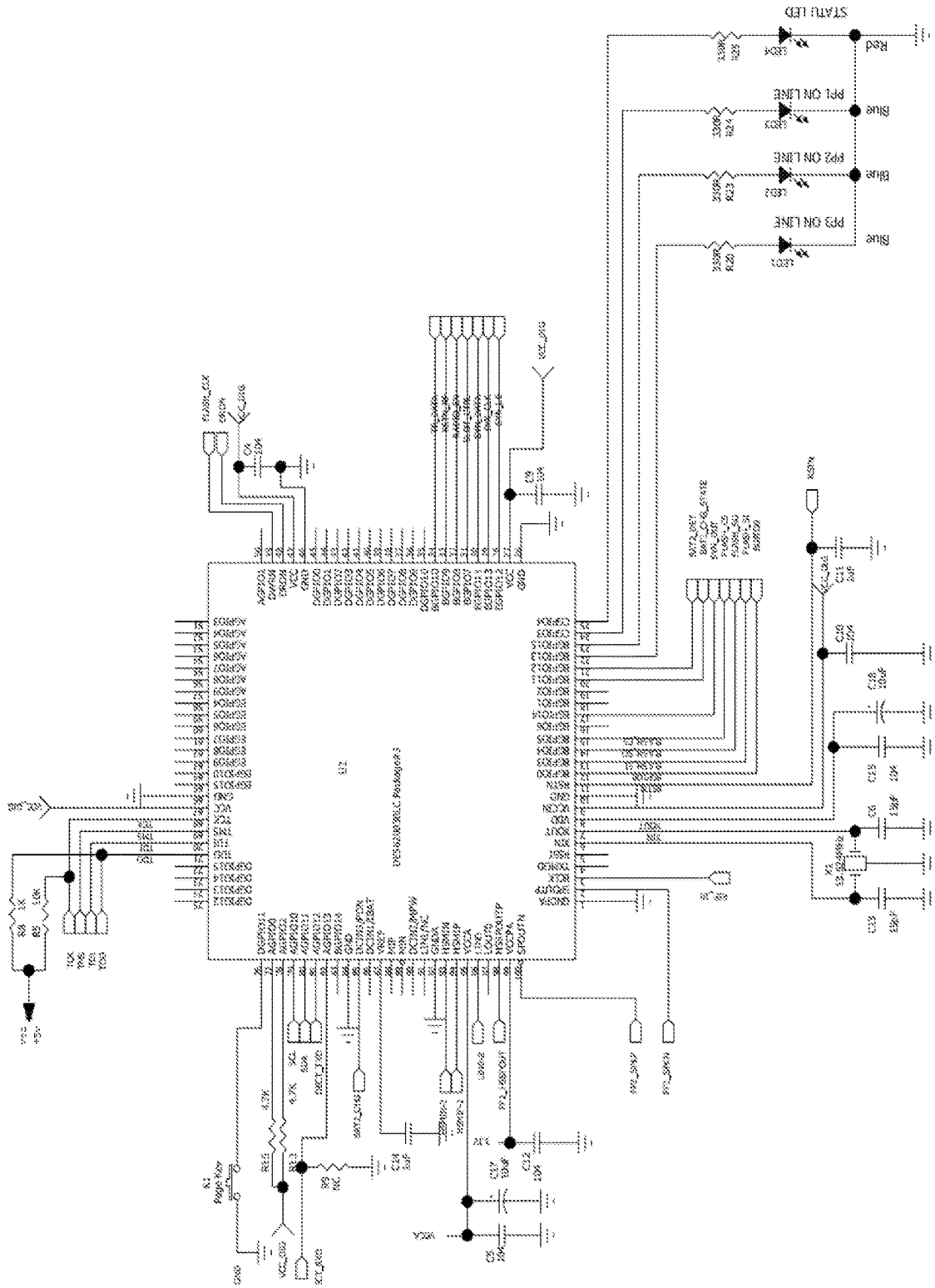
FIG. 6b is a circuit schematic diagram of a second part of a main control chip of a relay repeater in FIG. 1.
Figure 6C:
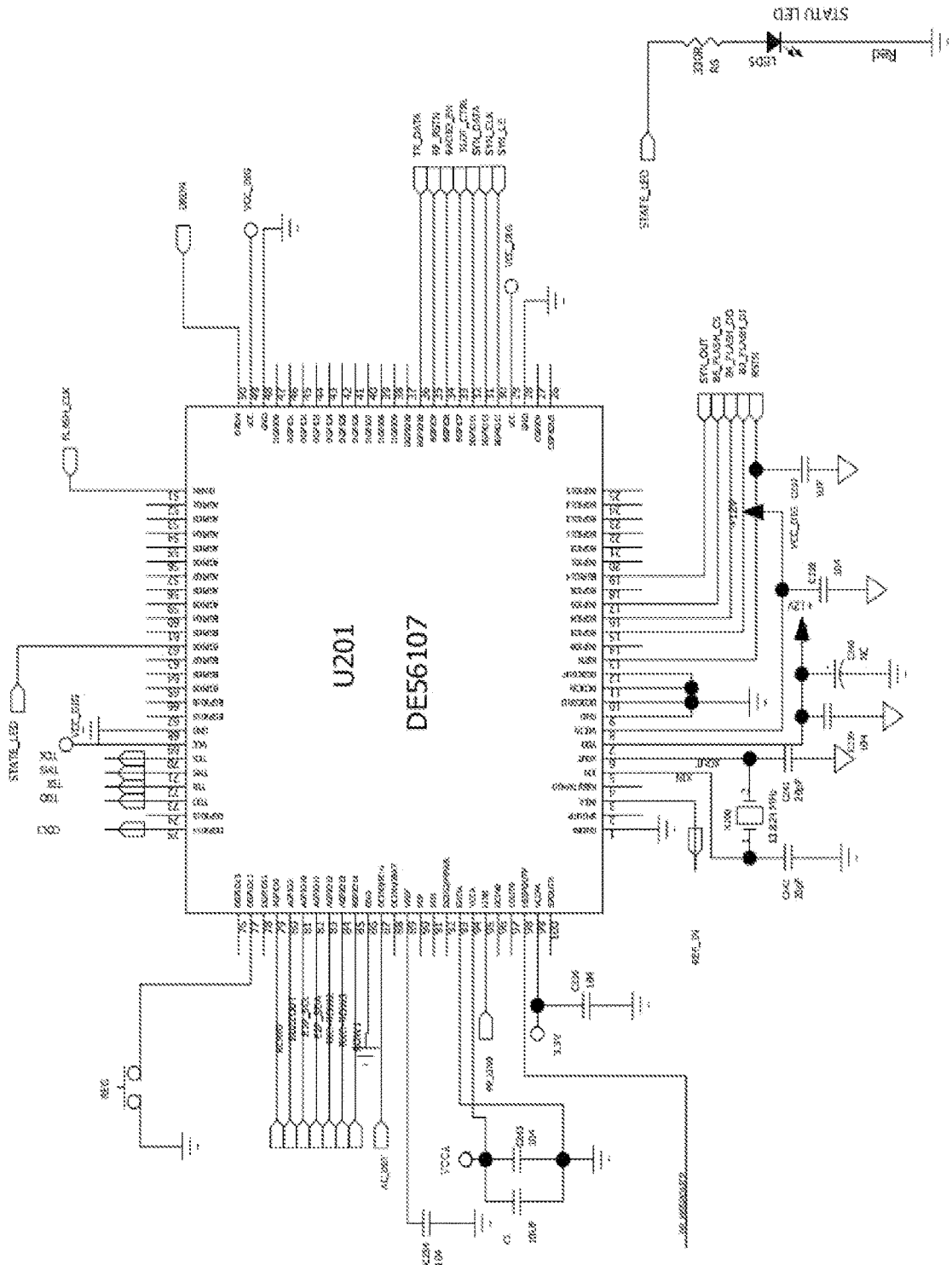
FIG. 6c is a circuit schematic diagram of a third part of a main control chip of a relay repeater in FIG. 1.
Figure 6D:
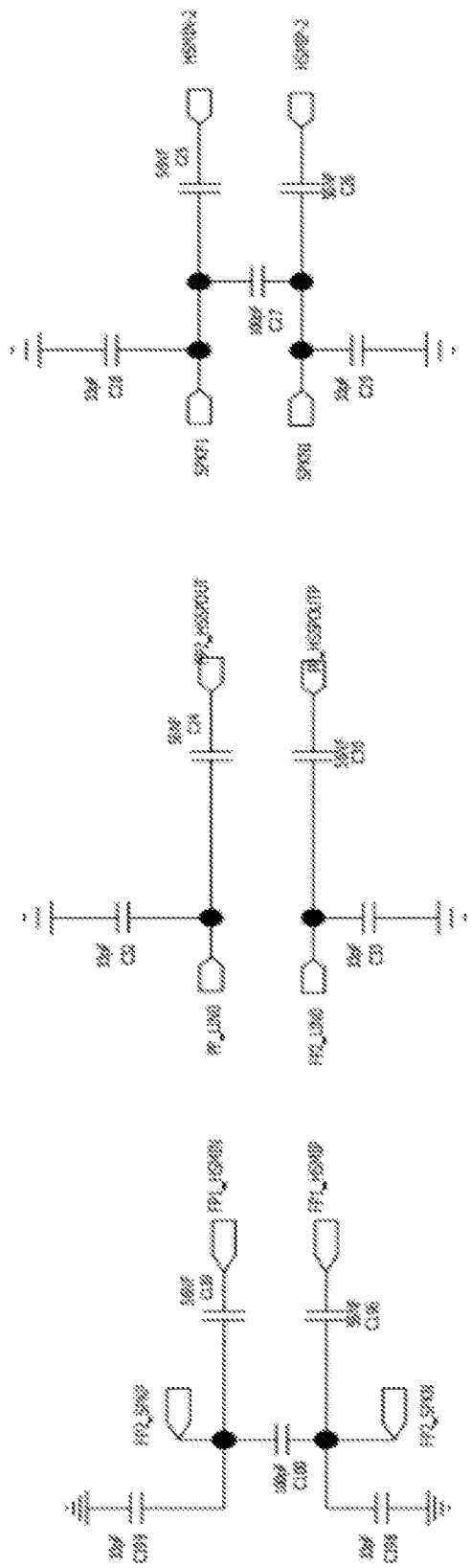
FIG. 6d is a circuit schematic diagram of a fourth part of a main control chip of a relay repeater in FIG. 1.

FIG. 6a is a circuit schematic diagram of a first part of a main control chip of a relay repeater in FIG. 1; FIG. 6b is a circuit schematic diagram of a second part of a main control chip of a relay repeater in FIG. 1; FIG. 6c is a circuit schematic diagram of a third part of a main control chip of a relay repeater in FIG. 1; FIG. 6*d* is a circuit schematic diagram of a fourth part of a main control chip of a relay repeater in FIG. 1.

As shown in FIGS. 6*a*-6*d*, the main control chip of the relay repeater 1 in this embodiment can be DE562003CLC, which is of course only an exemplary description, and other chips with DECT standard protocol functions are available. The specific connection relationship and the connection mode of each circuit component are understood with reference to the drawings, which will not be described and explained in detail.

Figure 7:
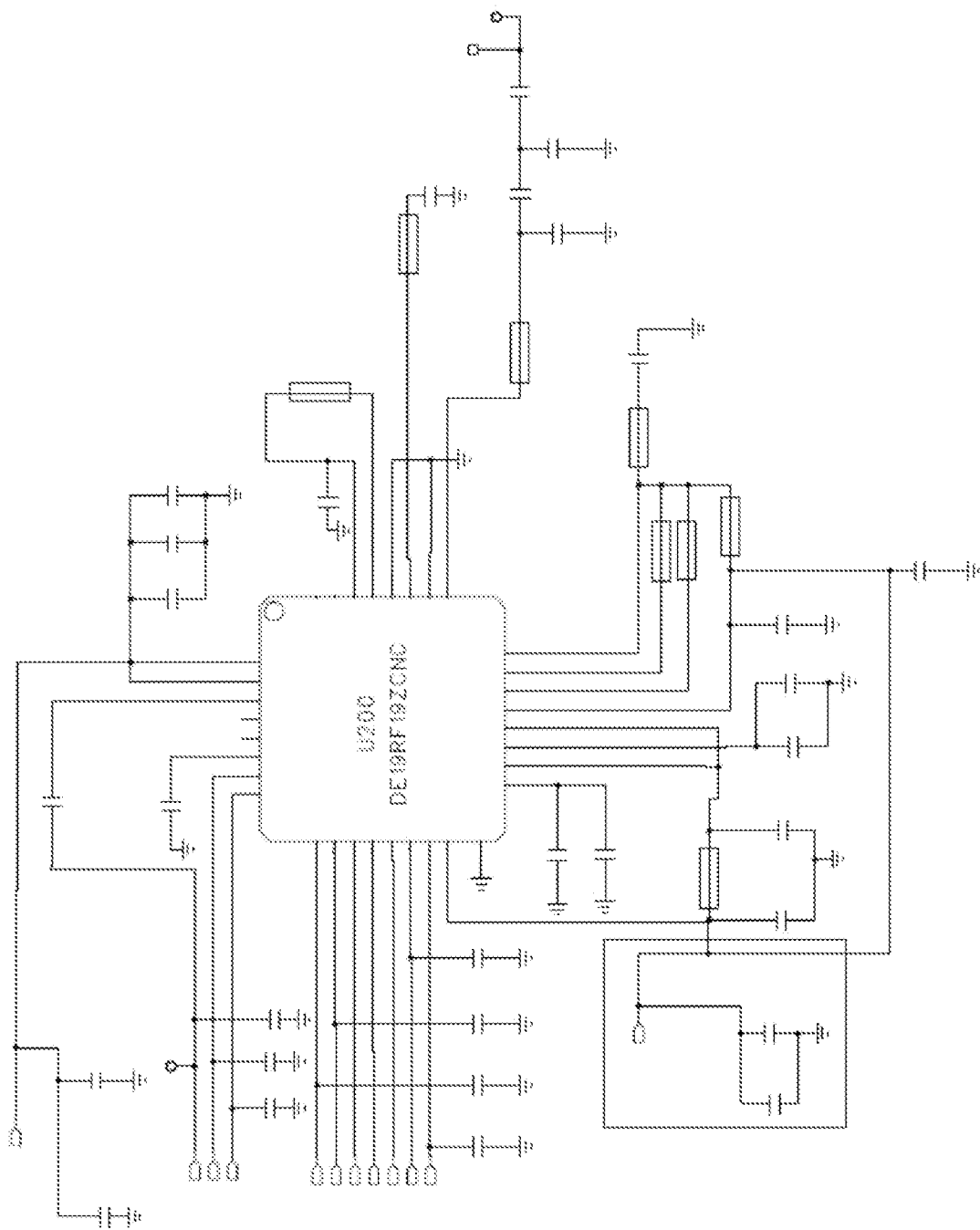
FIG. 7 is a circuit schematic diagram of a radio frequency chip of a digital walkie-talkie in FIG. 1.

FIG. 7 is a circuit schematic diagram of a radio frequency chip of a digital walkie-talkie in FIG. 1.

As shown in FIG. 7, the radio frequency chip of the digital walkie-talkie of this embodiment can be DE19RF19ZCNC. Of course, other chips can also be used, as long as it is a chip that can support reception and transmission of 1700-2000 Mhz radio frequency. The connection relationship of various components with the radio frequency chip as the core is shown in the figure, and each component will not be explained in detail.

Figure 8:
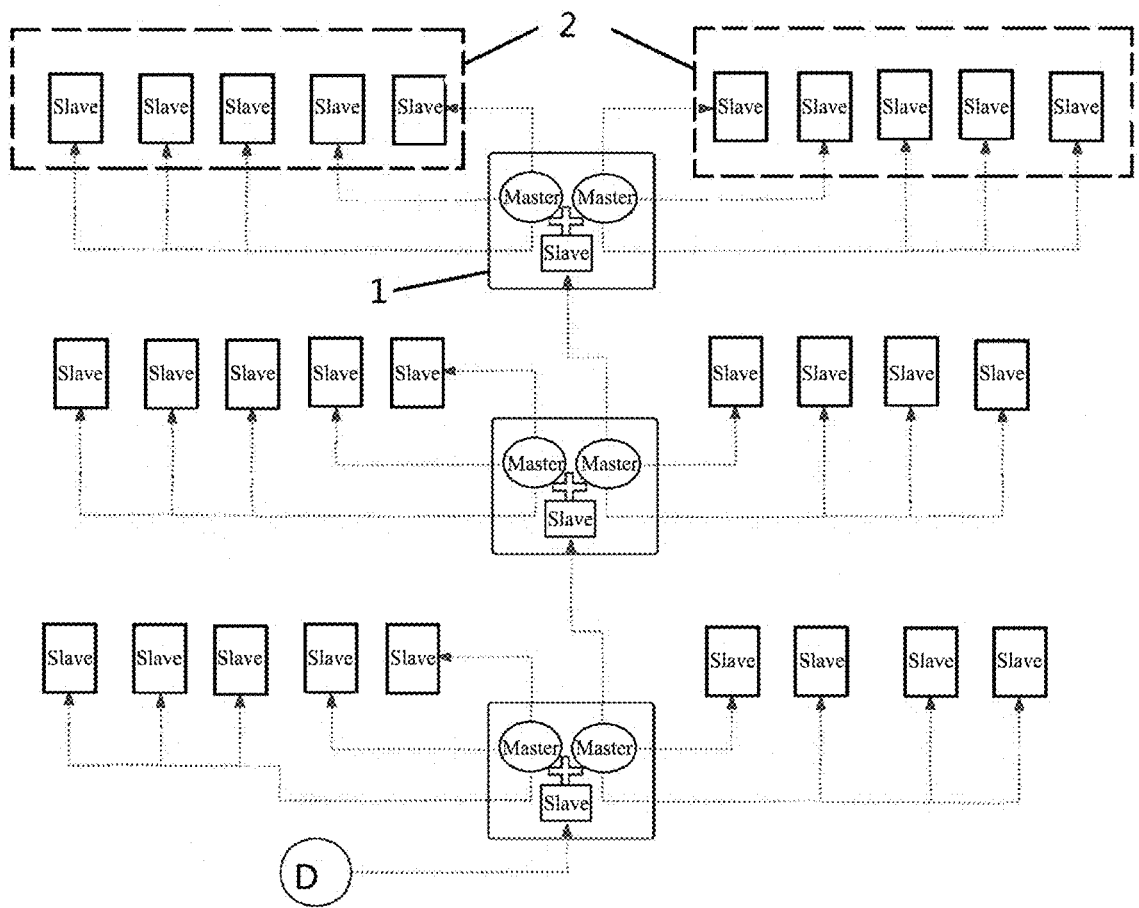
FIG. 8 is a schematic diagram of an extension of a relay repeater network communication system according to an embodiment of the present invention.

FIG. 8 is a schematic diagram of an extension of a relay repeater network communication system according to an embodiment of the present invention.

As shown in FIG. 8, the slave module in the relay repeater 1 can be connected to another relay repeater 1, thereby realizing expansion of an unlimited number, realizing multi-level cascading according to requirements, and increasing the range of mutual communications. The repeated part is from top to bottom, and if the position of D continues to be connected to the relay repeater 1, expansion of an unlimited number can be realized.

Further, the relay repeater 1 provided in this embodiment further comprises a walkie-talkie slave detection module. The walkie-talkie slave detection module is configured to detect the number of the walkie-talkie slaves respectively connected to the first walkie-talkie master 231, the second walkie-talkie master 241 and the third walkie-talkie master 251, so as to be extended or deleted according to the number. The relay repeater may further comprise a registration module. The registration module realizes the paired connection between the walkie-talkie slave and the first walkie-talkie master 231, the second walkie-talkie master 241 and the third walkie-talkie master 251, so as to realize the encrypted transmission of the voice signal.

Specifically, when a working connection is established for the first time, a registration operation is required. Both the master and the slave enter the registration mode. The slave (PP) sends a registration request to the master (FP). The master first retrieves whether the 3 time slots available to the slave are free. If there is a free time slot, the time slot is allocated to the slave that initiates the registration request, and the registration information of the slave is recorded in the master registration list; if there is no free time slot, the master will retrieve whether the registered slave is online (turning on and establishing a connection). If there is a slave which is not online, the registration information of this slave is deleted, and the time slot is re-allocated to the slave of the new registration request, otherwise the registration request of the slave of the new registration request is rejected. The master registration mode of this embodiment is a cyclic registration mode, which is different from a general dect device. That is, after the master of the present invention enters the code matching registration waiting mode, when a slave sends the code matching registration information, the master and the slave complete the code matching registration operation, and then the master detects whether the number of registered slaves has reached the maximum number of registrations. If it has not reached the maximum number, it will continue to be in the waiting code matching mode or exit the code matching mode after pressing the code matching button again, otherwise it will exit the waiting code matching mode and enter the normal working mode.

The present invention is a multi-party voice communication system based on a head-mounted digital walkie-talkie and a wireless relay repeater 1. The system device is simple in structure and convenient to carry, use and keep. It adopts full-duplex communication. The single relay repeater 1 can realize simultaneous voice forwarding for 9-15 people and realize group communication, which is convenient for the collaborative work; the present invention can use another relay repeater 1 as an extended device in terms of the function of the current single relay repeater 1 so as to realize an unlimited number of walkie-talkie relay repeater forwarding functions. The present invention performs digitally coded communication, which requires code matching registration operations, and can only accept and send languages in the group. The content of the call is encrypted communication during transmission, which is good in confidentiality and security; the present invention does not require a PTT switch for call receiving/sending conversion, and does not require language recognition to turn on and send a language, freeing your hands and avoiding losing communication voice. The present invention is compatible with cordless telephone communication frequency bands in Europe, Taiwan, Thailand, Brazil, Latin America, the United States (DECT6.0), South Korea (KDECT), Japan (JDECT) and other countries. The same solution is also suitable for related applications of 2.4 GHz frequency band. The present invention uses the DECT system, comprising multiple carriers (MC), time division multiple access (TDMA), time division duplex principle (TDD) radio frequency access mode multiplexing, GFSK modulation, HFSS dynamic frequency hopping channel selection mode. The present invention supports ADPCM (Adaptive Differential Pulse Code Modulation) voice coding, and supports μ-law and A-law algorithm PCM. The present invention uses ADPCM coding format for voice communication, supports 8 high-definition voice channels of 32 Kbs, and is compatible with the ITUG.726 voice coding format. The present invention can use a single repeater to realize synchronization and support up to 15 full-duplex voice walkie-talkie devices for simultaneous voice communication. The present invention supports device voice wake-up, voice registration, voice volume control and voice mute functions. The present invention supports dedicated radio frequency bands and is not susceptible to interferences from other wireless communication device, supporting outdoor communication distance of 300 meters. The present invention supports the USB charging function, and can realize the working mode of multi-person speech, multi-person listening, and multi-person participation, so that the system can also be applied to scenarios such as mobile meetings, on-site construction, emergency rescue, military training, and traffic law enforcement monitoring. The adopted DECT protocol system comprises multiple carriers (MC), time division multiple access (TDMA), time division duplex principle (TDD) radio frequency access mode, dynamic channel selection, large system capacity, good confidentiality, high bandwidth, low bit error rate, stable communication and good quality. An unlimited number of terminal voice networks can be achieved through the relay repeater 1, and the typical scenario can support high-definition voice simultaneous calls of 15-30 terminals.

Figure 9A:
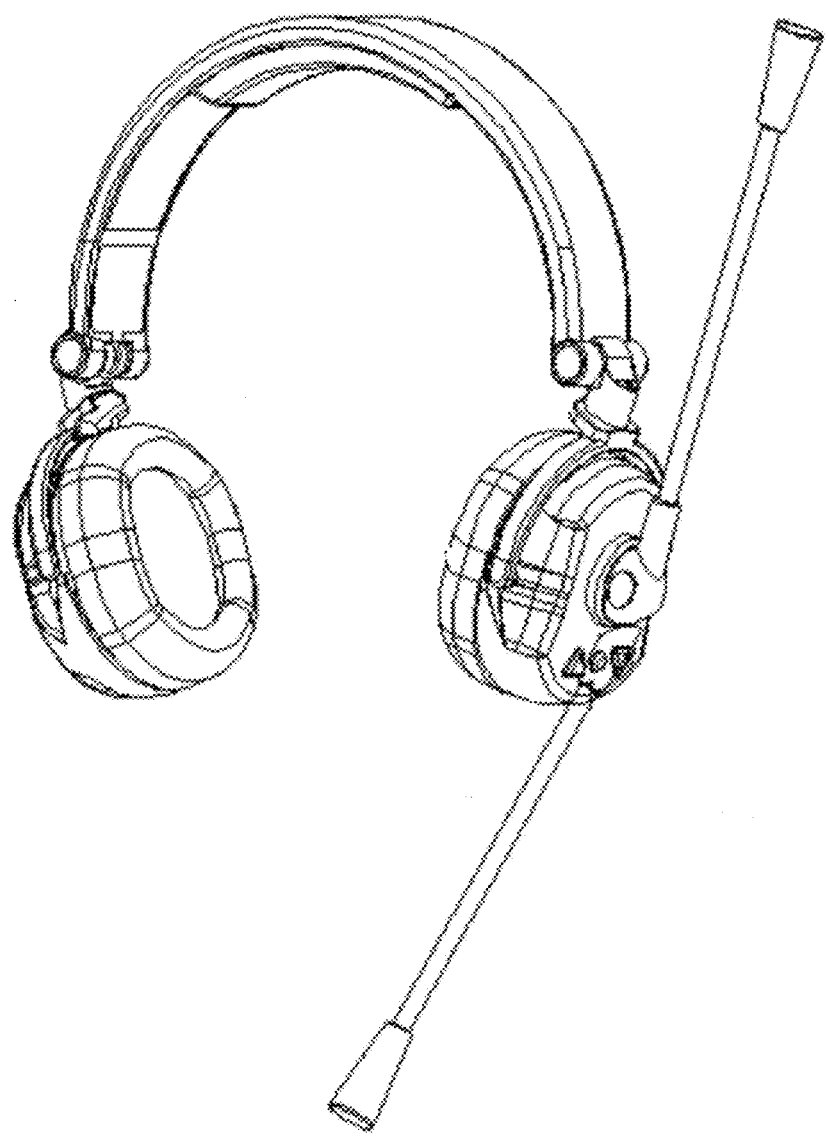
FIG. 9a is a schematic diagram of the structure of a digital walkie-talkie according to an embodiment of the present invention.
Figure 9B:
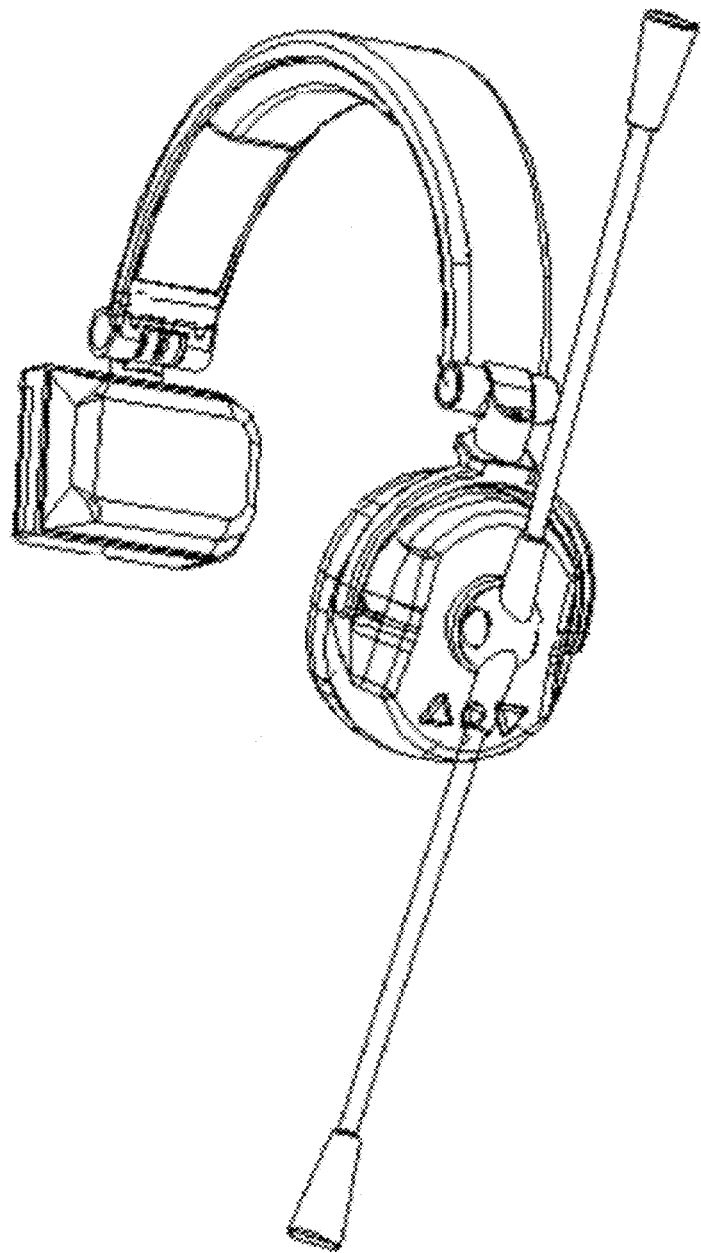
FIG. 9b is a schematic diagram of another structure of a digital walkie-talkie according to an embodiment of the present invention.

FIG. 9a is a schematic diagram of the structure of a digital walkie-talkie according to an embodiment of the present invention; FIG. 9b is a schematic diagram of another structure of a digital walkie-talkie according to an embodiment of the present invention.

As shown in FIG. 9a and FIG. 9b, the use of the head-mounted structure makes it easy to use, and can free hands. The body structure and principle of the head-mounted digital walkie-talkie can be understood with reference to the prior art. FIG. 9a is a head-mounted digital walkie-talkie of a binaural morphological structure. FIG. 9b is a head-mounted digital walkie-talkie of a monaural morphological structure. The binaural type and the monaural type can both be implemented. At the same time, a head beam, a protective foam, an MIC, a microphone rod, a microphone rod rotating structure and a micro switch, a volume adjustment and code matching multiplexing switch, a main switch, a headset main board, a battery compartment cover, a headset extension, and other structures are all of the structure of the DECT-based head-mounted digital walkie-talkies produced by our company, which can be understood by reference and will not be described in detail.

It can be understood that the same or similar parts in the above embodiments may be referred to each other, and the contents not described in detail in some embodiments may refer to the same or similar contents in other embodiments.

It should be noted that in the description of the present invention, the terms "first", "second", etc. are only used for descriptive purposes, and cannot be understood as indicating or implying relative importance. In addition, in the description of the present invention, unless otherwise specified, the meaning of "multiple" means at least two.

In the description of this specification, descriptions with reference to the terms "one embodiment", "some embodiments", "examples", "specific examples", or "some examples" etc. mean that specific features, structure, materials or characteristics described in conjunction with the embodiments or examples are included in at least one embodiment or example of the present invention. In this specification, the schematic representation of the above terms does not necessarily refer to the same embodiment or example. Moreover, the described specific features, structures, materials or characteristics may be combined in any one or more embodiments or examples in a suitable manner.

Although the embodiments of the present invention have been shown and described above, it can be understood that the above embodiments are exemplary and should not be construed as limiting the present invention. Those skilled in the art can make changes, modifications, substitutions and variations to the above embodiments within the scope of the present invention.

What is claimed is:

1. A relay repeater network communication system, comprising:
a relay repeater and three digital walkie-talkie sets, wherein each of the three digital walkie-talkie sets comprises at least one digital walkie-talkie, the relay repeater is connected to each of the digital walkie-talkies in each of the three digital walkie-talkie sets, and the relay repeater communicates with each of the digital walkie-talkies through the Digital Enhanced Cordless Telecommunication (DECT) communication method to realize the mutual communication between each of the digital walkie-talkies;
wherein the relay repeater comprises:
a first master module, a second master module, and a first slave module;
wherein the three digital walkie-talkie sets are a first direct-connected walkie-talkie set, a second direct-connected walkie-talkie set and a first extended walkie-talkie set;
wherein the first direct-connected walkie-talkie set, the second direct-connected walkie-talkie set and the first extended walkie-talkie set all comprise at least one digital walkie-talkie;
wherein the first master module and the second master module are respectively connected to the first direct-connected walkie-talkie set and the second direct-connected walkie-talkie set, and the first slave module is connected to the first extended walkie-talkie set;
wherein the first master module, the second master module, and the first slave module superimpose the voice signal of each of the digital walkie-talkies in an AC-coupled manner to realize the mutual communication between each of the digital walkie-talkies;
wherein the first extended walkie-talkie set comprises a first walkie-talkie master and at least one walkie-talkie slave; and
wherein the first slave module is connected to the first walkie-talkie master, and the first walkie-talkie master is also connected to each of the at least one walkie-talkie slaves through TDMA to realize the expansion of the number of digital walkie-talkies in the first extended walkie-talkie set.

2. The relay repeater network communication system according to claim 1, wherein the first direct-connected walkie-talkie set comprises five walkie-talkie slaves, the second direct-connected walkie-talkie set comprises five walkie-talkie slaves, and the first extended walkie-talkie set comprises four walkie-talkie slaves.

3. The relay repeater network communication system according to claim 2, wherein the relay repeater further comprises a walkie-talkie slave detection module; the walkie-talkie slave detection module is configured to detect the number of the walkie-talkie slaves respectively connected to the first walkie-talkie master, the second walkie-talkie master and the third walkie-talkie master to be extended or deleted according to the number.

4. The relay repeater network communication system according to claim 3, wherein the relay repeater further comprises a registration module; the registration module realizes the paired connection between the walkie-talkie slave and the first walkie-talkie master, the second walkie-talkie master and the third walkie-talkie master to realize the encrypted transmission of the voice signal.

5. The relay repeater network communication system according to claim 1, wherein the relay repeater further comprises:
a third master module, a second slave module, and a third slave module;
wherein the three walkie-talkie sets are a third direct-connected walkie-talkie set, a second extended walkie-talkie set and a third extended walkie-talkie set;
wherein the third direct-connected walkie-talkie set, the second extended walkie-talkie set and the third extended walkie-talkie set all comprise at least one digital walkie-talkie;
wherein the third master module is connected to the third direct-connected walkie-talkie set, and the second slave module and the third slave module are respectively connected to the second extended walkie-talkie set and the third extended walkie-talkie set; and
wherein the third master module, the second slave module, and the third slave module superimpose the voice signal of each of the digital walkie-talkies in an AC-coupled manner, so as to realize the mutual communication between each of the digital walkie-talkies.

6. The relay repeater network communication system according to claim 5, wherein the second extended walkie-talkie set comprises a second walkie-talkie master and at least one walkie-talkie slave;

the third extended walkie-talkie set comprises a third walkie-talkie master and at least one walkie-talkie slave;

the second slave module is connected to the second walkie-talkie master, and the second walkie-talkie master is also connected to each of the walkie-talkie slaves through TDMA to realize the expansion of the number of digital walkie-talkies in the second extended walkie-talkie set;

the third slave module is connected to the third walkie-talkie master, and the third walkie-talkie master is also connected to each of the walkie-talkie slaves through TDMA to realize the expansion of the number of digital walkie-talkies in the third extended walkie-talkie set.

7. The relay repeater network communication system according to claim 6, wherein the third direct walkie-talkie set comprises five walkie-talkie slaves, the second extended walkie-talkie set comprises four walkie-talkie slaves, and the third extended walkie-talkie set comprises four walkie-talkie slaves.

8. The relay repeater network communication system according to claim 7, wherein the relay repeater further comprises a walkie-talkie slave detection module; the walkie-talkie slave detection module is configured to detect the number of the walkie-talkie 5 slaves respectively connected to the first walkie-talkie master, the second walkie-talkie master and the third walkie-talkie master, so as to be extended or deleted according to the number.

9. The relay repeater network communication system according to claim 5, wherein the first slave module, the second slave module and the third slave module are all connectable to an extended relay repeater, through which an unlimited number of digital walkie-talkies are extended.

10. The relay repeater network communication system according to claim 1, wherein the first slave module, the second slave module and the third slave module are all connectable to an extended relay repeater, through which an unlimited number of digital walkie-talkies are extended.

* * * * *